United States Patent
Endo et al.

(10) Patent No.: US 7,781,013 B2
(45) Date of Patent: Aug. 24, 2010

(54) METHOD OF DESIGNING A DIFFUSION FILM, A PROCESS FOR PRODUCING THE SAME, AND A DIFFUSION FILM OBTAINED THEREBY

(75) Inventors: Toshiaki Endo, Kanagawa (JP); Akihiko Takeda, Shizuoka (JP); Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 548 days.

(21) Appl. No.: 11/884,761

(22) PCT Filed: Feb. 17, 2006

(86) PCT No.: PCT/JP2006/302813
§ 371 (c)(1),
(2), (4) Date: Aug. 21, 2007

(87) PCT Pub. No.: WO2006/088122
PCT Pub. Date: Aug. 24, 2006

(65) Prior Publication Data
US 2008/0167742 A1   Jul. 10, 2008

(30) Foreign Application Priority Data
Feb. 21, 2005 (JP) .............................. 2005-044109

(51) Int. Cl.
*B05D 1/12* (2006.01)
(52) U.S. Cl. ................. 427/180; 427/163.4; 427/195
(58) Field of Classification Search .............. 427/163.4, 427/180, 195
See application file for complete search history.

(56) References Cited

U.S. PATENT DOCUMENTS

| | | | | |
|---|---|---|---|---|
| 4,384,056 A | * | 5/1983 | Schmidt et al. | 523/221 |
| 5,620,775 A | * | 4/1997 | LaPerre | 428/149 |
| 6,355,302 B1 | * | 3/2002 | Vandenberg et al. | 427/163.4 |

FOREIGN PATENT DOCUMENTS

| | | |
|---|---|---|
| JP | 07-218705 A | 8/1995 |
| JP | 11-194204 A | 7/1999 |
| JP | 2002-127341 A | 5/2002 |
| JP | 2003-131204 A | 5/2003 |
| JP | 2004-46303 A | 2/2004 |
| JP | 2004-164426 A | 6/2004 |
| WO | WO2007140484 | * 12/2007 |

OTHER PUBLICATIONS

International Preliminary Report dated Sep. 6, 2007.

* cited by examiner

*Primary Examiner*—Frederick J Parker
(74) *Attorney, Agent, or Firm*—Sughrue Mion, PLLC

(57) ABSTRACT

A transparent support and plural types of particle groups having different particle size distributions each other that are to be contained in a light diffusing layer are provided. a blending ratio of the plural types of particle groups is computed such that a space packing ratio of respective particles in the light diffusing layer becomes a specified space packing ratio and the plural types of particle groups having been blended in the computed blending ratio are dispersed on the transparent support, whereby the light diffusing layer is formed on the transparent support. Thus, a diffusion film can be produced simply and at low cost.

17 Claims, 5 Drawing Sheets

METHOD OF DESIGNING A DIFFUSION FILM, A PROCESS FOR PRODUCING THE SAME, AND A DIFFUSION FILM OBTAINED THEREBY

TECHNICAL FIELD

The present invention relates to a method of designing a diffusion film to be used in liquid-crystal displays and the like, a process for producing the same, and a diffusion film obtained thereby.

BACKGROUND ART

Liquid-crystal display devices use a backlight unit that irradiates the liquid-crystal panel (LCD) with light from behind, thereby illuminating the liquid-crystal panel. The backlight unit is basically composed of an illuminating light source, a lightguide that diffuses the light emerging from the light source so as to irradiate the liquid-crystal panel, and a diffusion film that renders the light uniform as it is radiated from the lightguide.

Among those components of the backlight unit, the diffusion film is manufactured from a transparent support such as PET (polyethylene terephthalate) on which is formed a light diffusing layer comprising polymer particles having optical transparency. The diffusion film is provided on the side of the lightguide from which light issues and, as mentioned above, it is used to ensure that the light emerging from the lightguide is diffused uniformly, thus requiring good light diffusion and transmission.

JP 7-218705 A discloses a light diffusing film which, in order to strike a balance at increased level between light transmission and diffusion, comprises a substrate having a layer of a composition coated on one or both sides of it, the composition having 50-500 parts by weight of acrylic particles dispersed in 100 parts by weight of one or more light-transmitting resins in admixture, the acrylic particles having a refractive index different from that of the one or more light-transmitting resins in admixture by a value in the range of 0.01-0.15 and also having an average particle size of 1-50 µm. According to JP 7-218705 A, a light-diffusing film striking a balance between good light-transmitting and diffusing properties can be obtained that features a total light transmittance of at least 90% and a haze of at least 85%.

JP 11-194204 A discloses a light diffusing sheet which, in order to strike an improved balance between visual field enlarging capability and front brightness, has transparent light diffusing particles dispersed in a transparent matrix resin, the absolute value between the refractive index of the matrix resin and that of the light diffusing particles being in the range of 0.05-0.24, and the concentration of the particles in the sheet being provided with such a gradient that it gradually varies in the direction of thickness.

PATENT DOCUMENT 1: JP 7-218705 A
PATENT DOCUMENT 2: JP 11-194204 A

DISCLOSURE OF THE INVENTION

Problems to be Solved by the Invention

The manufacture of diffusion films usually involves trial preparation of samples from admixtures of various materials. The prepared samples of diffusion film are checked to see if they have optimum light transmitting and diffusing properties and if they are found to have the desired performance, full-scale production is started under those conditions. This means that unless the materials are actually mixed to prepare samples of diffusion film, it is not certain if their performance exemplified by light transmitting and diffusing properties is optimized. As a result, in order to obtain the desired light transmitting and diffusing properties, it has been necessary to repeat trials and errors by variously changing the types of the resin materials that are to be mixed or changing the blending ratio of these materials to various values; this has taken such time and cost in design that extreme diseconomy has resulted.

The present invention has been accomplished in order to solve the aforementioned problems; it is, therefore, one object of the present invention to provide a method of designing a diffusion film by which a diffusion film having the desired light transmitting and diffusing properties and haze can be obtained in a systematic and simple way; another object of the present invention is to provide a process for producing this diffusion film; yet another object of the present invention is to provide a diffusion film that is obtained by that design method and production process.

Means to Solve the Problems

In order to attain its first object, the present invention provides according to its first aspect a method of designing a diffusion film that that has a light diffusing layer on a transparent support and diffuses incident light so that said incident light emerges as diffused light, which comprises the steps of specifying plural types of particle groups that are to be contained in said light diffusing layer, said plural types of particle groups having different particle size distributions each other setting a space packing ratio of said plural types of particle groups in said light diffusing layer; and computing a blending ratio of the respective plural types of particle groups such that said space packing ratio is obtained.

In the method of designing a diffusion film according to the first aspect of the present invention, said blending ratio is preferably computed using particle swarm optimization. It is also preferred that said space packing ratio is set within a range from 70% (inclusive) to 90% (inclusive).

In the method of designing a diffusion film according to the first aspect of the present invention, said blending ratio is preferably computed by a calculation method comprising a blending ratio setting step of setting an initial value of the blending ratio, a space setting step of setting a virtual space in which to arrange the individual particles of said plural types of particle groups, a particle arranging step of arranging said individual particles of said plural types of particle groups irregularly in said space, a packing ratio computing step in which if all particles of said plural types of particle groups are arranged in said space, said space is reduced and said particle arranging step is executed in the reduced space and if not all particles of said plural types of particle groups are arranged in said space, a packing ratio of said plural types of particle groups is computed from a volume of the space in which the particles have been last packed, and an evaluation step in which the packing ratio computed by said packing ratio computing step is compared with said space packing ratio to see if the two are equal, and if not, the initial value of said blending ratio is updated and said space setting step is executed with the updated blending ratio.

In still another preferred embodiment, the step of computing and setting any one of parameters selected from the group consisting of means and variances of the particle size distributions of said plural types of particle groups, as well as constants in a case where each of the particle size distributions of said plural types of particle groups is approximated by a binomial distribution. It is also preferred that said plural types of particle groups are a polymer having optical transparency.

According to its second aspect, the present invention provides a method of designing a diffusion film that has a light diffusing layer on a transparent support and diffuses incident light so that said incident light emerges as diffused light, which comprises the steps of setting a space packing ratio of particle groups that are to be contained in said light diffusing layer, computing any one of parameters selected from the group consisting of means and variances of particle size distributions of said particle groups, as well as constants in a binomial distribution by which said particle size distributions of said particle groups are approximated such that said space packing ratio is obtained, and designing said light diffusing layer using said particle groups having said particle size distributions that are specified by the parameter.

In the method of designing a diffusion film according to the second aspect of the present invention, said parameter is preferably computed using particle swarm optimization. It is also preferred that said space packing ratio is set within a range from 70% (inclusive) to 90% (inclusive).

According to its third aspect, the present invention provides a process for producing a diffusion film that has a light diffusing layer on a transparent support and diffuses incident light so that said incident light emerges as diffused light, which comprises the steps of, providing both said transparent support and plural types of particle groups that are to be contained in said light diffusing layer, said plural types of particle groups having different particle size distributions each other, computing a blending ratio of said plural types of particle groups such that a space packing ratio of said respective particles in said light diffusing layer becomes a specified space packing ratio, and dispersing and adhering said plural types of particle groups having been blended in the computed blending ratio on said transparent support to form said light diffusing layer on said transparent support.

In the method of designing a diffusion film according to the third aspect of the present invention, said blending ratio is preferably computed using particle swarm optimization. It is also preferred that said specified space packing ratio is within a range from 70% (inclusive) to 90% (inclusive).

In the process for producing a diffusion film according to the third aspect of the present invention, said blending ratio is computed by a calculation method comprising a blending ratio setting step of setting an initial value of said blending ratio, a space setting step of setting a virtual space in which to arrange individual particles of said plural types of particle groups, a particle arranging step of arranging said individual particles of said plural types of particle groups irregularly in said space, a packing ratio computing step in which if all particles of said plurality of particle groups are arranged in said space, said space is reduced and said particle arranging step is executed in the thus reduced space and if not all particles of said plural types of particle groups are arranged in said space, a packing ratio of said plural types of particle groups is computed from a volume of the space in which the particles have been last packed, and an evaluation step in which the packing ratio computed by said packing ratio computing step is compared with said space packing ratio to see if the two are equal, and if not, the initial value of said blending ratio is updated and said space setting step is executed with the updated blending ratio.

It is also preferred that said plural types of particle groups are formed of a polymer having optical transparency.

According to its fourth aspect, the present invention provides a process for producing a diffusion film that has a light diffusing layer on a transparent support and diffuses incident light so that said incident light emerges as diffused light, which comprises the steps of computing preliminarily any one of parameters selected from the group consisting of means and variances of particle size distributions of particle groups, as well as constants in a binomial distribution by which said particle size distributions of said particle groups are approximated such that a space packing ratio of said particle groups to be contained in said light diffusing layer becomes a specified space packing ratio, and allowing the particle groups having the particle size distributions that are specified by the computed parameter to disperse and adhere on said transparent support to form said light diffusing layer on said transparent support.

In the process for producing a diffusion film according to the fourth aspect of the present invention, said parameter is computed using particle swarm optimization. It is also preferred that said specified space packing ratio is within a range from 70% (inclusive) to 90% (inclusive).

According to its fifth aspect, the present invention provides a diffusion film that is produced by the producing process according to its third or fourth aspect.

The diffusion film according to the fifth aspect of the present invention is preferably such that said space packing ratio of said particle groups in the light diffusing layer is within a range from 70% (inclusive) to 90% (inclusive).

Effects of the Invention

According to the design method that follows the first aspect of the present invention, the space packing ratio of a plurality of particle groups having different particle size distributions that are to be contained in the light diffusing layer is set and the blending ratio that can provide such space packing ratio is computed; hence, a diffusion film having desired characteristics that are suited to a specific object or application of use can be designed in a simple way. Consequently, by using the design method according to the first aspect of the present invention as a guideline for design, the costs of developing and manufacturing the diffusion film can be reduced.

In the design method according to the second aspect of the present invention, any one of the parameters selected from the group consisting of the mean and variance of the particle size distributions of the particle groups, as well as the constants in a binomial distribution by which the particle size distributions of the particle groups are approximated is computed in order to ensure that the space packing ratio of the particle groups to be contained in the light diffusing layer will assume the desired space packing ratio, and the light diffusing layer is designed using the particle groups having the particle size distributions that are specified by that parameter; hence, as in the design method according to the first aspect, a diffusion film having desired characteristics that are suited to a specific object or application of use can be designed in a simple way and using this design method as a guideline for design, the costs of developing and manufacturing the diffusion film can be reduced.

In the production process according to the third aspect of the present invention, the blending ratio of the plurality of particle groups is computed such that the space packing ratio of the respective particles in the light diffusing layer will assume the desired space packing ratio and the plurality of particle groups that have been blended in the computed blending ratio are adhered as dispersed on the transparent support, whereby the light diffusing layer is formed on the transparent support to produce a diffusion film; hence, there is no need to repeat many trials and errors until the desired performance is obtained and a diffusion film having the desired performance can be manufactured simply and at low cost.

And in the production process according to the fourth aspect of the present invention, in order to ensure that the space packing ratio of the particle groups to be contained in the light diffusing layer will assume a specified space packing ratio, any one of the parameters selected from the group consisting of the mean and variance of the particle size distributions of the particle groups, as well as the constants in a binomial distribution by which the particle size distributions of the particle groups are approximated is computing preliminarily, and the particle groups having the particle size distributions that are specified by the computed parameter are allowed to adhere as dispersed on the transparent support, whereby the light diffusing layer is formed on the transparent support to produce a diffusion film; hence, as in the production process according to the third aspect, there is no need to repeat many trials and errors and a diffusion film having the desired performance can be manufactured simply and at low cost.

The diffusion film according to the fifth aspect of the present invention is produced by the production process according to the third or fourth aspect of the present invention and, hence, it can be manufactured in a fewer steps than in the prior art and is less expensive than in the prior art.

BRIEF DESCRIPTION OF THE DRAWINGS

FIG. 5A shows the particle size distribution of particles with a mean particle size of 5 μm; FIG. 5B shows the particle size distribution of particles with a mean particle size of 8 μm; FIG. 5C shows the particle size distribution of particles with a mean particle size of 12 μm; FIG. 5D shows the particle size distribution of particles with a mean particle size of 15 μm; and FIG. 5E shows the particle size distribution of particles with a mean particle size of 18 μm.

LEGEND 10 diffusion film
12 transparent support
13 adhesive layer
14 light diffusing layer
15 back coating layer
BS boundary surface
P particle
V1 three-dimensional space

BEST MODE FOR CARRYING OUT THE INVENTION

On the pages that follow, an embodiment of the method of designing a diffusion film, the process for producing the same, and a diffusion film obtained thereby, each following the present invention, is described in detail on the basis of the preferred mode depicted in the accompanying drawings.

Figure 1:
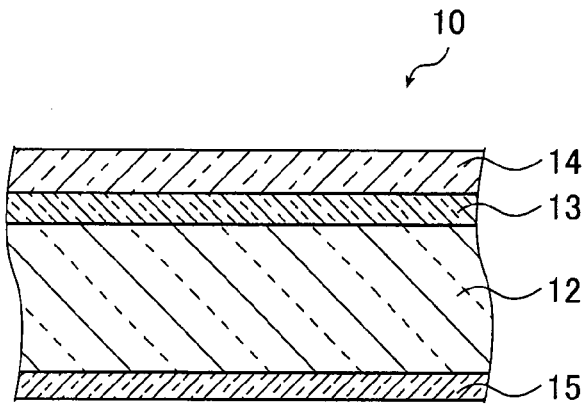
FIG. 1 shows schematically a cross-sectional structure of a diffusion film.

To begin with, a cross-sectional structure of the diffusion film to be produced is shown schematically in FIG. 1. The diffusion film generally indicated by 10 comprises a transparent support 12 which has an adhesive layer 13 and a light diffusing layer 14 on one side (the upper side of FIG. 1) and a back coating layer 15 on the other side (the lower side of FIG. 1). The diffusion film 10 may typically be provided on the side of the lightguide in a liquid-crystal display device from which light issues and it can render the light uniform as it emerges from the light exit side of the lightguide.

In FIG. 1, the transparent support 12 is a support in sheet form that is transparent to the light used and it can be composed of any sheet that has adequate mechanical strength. Materials for the transparent support 12 include transparent resin materials such as plastics, and glass. Examples of the transparent resin materials include polyesters (e.g. polyethylene terephthalate and polyethylene naphthalate), polyolefins (e.g. polyethylene and polypropylene), polyamides, polyethers, polystyrenes, polyester amides, polycarbonates, poly(phenylene sulfide), polyether esters, poly(vinyl chloride), poly(methacrylate esters), poly(acrylic esters), etc.

The thickness of the transparent support 12 is not limited in any particular way but it is preferably in the range from 0.02 mm (inclusive) to 4.0 mm (inclusive), and from the viewpoint of ease in handling during the application of coatings, it is more preferably in the range from 0.03 mm (inclusive) to 0.3 mm (inclusive).

In order to enhance the adhesion to the light diffusing layer, the surface of the transparent support 12 may be subjected to a surface treatment as by electric discharge or, alternatively, it may be provided with an adhesive layer, a subbing layer or the like.

The light diffusing layer 14 to be formed on the transparent support 12 is formed from a plurality of polymeric materials having different particle size distributions that can be fixed as dispersed in a binder. The particles of such plurality of polymers are blended in a specified packing ratio. The packing ratio of the polymer particles in the light diffusing layer 14 is preferably in the range from 70% (inclusive) to 90% (inclusive) in order to obtain a diffusion film having high transmittance.

Materials for the polymer particles are not limited in any particular way and particles that are formed from organic polymers such as cross-linkable acrylic or methacrylic resins, polyethylene, polypropylene, polystyrene, silicone resins, melamine resins, etc. are preferred, with cross-linkable (meth)acrylic resins being particularly preferred from the viewpoints of refractive index and cost. The light diffusing layer 14 may be composed from the particles of a plurality of polymers in admixture that differ in both mean particle size and material or it may be composed of polymer particles that are of the same material but different in mean particle size and which are mixed in specified proportions.

In order to attain a higher packing ratio, the polymer particles are preferably of a spherical shape and their mean particle size is preferably in the range from 1 μm (inclusive) to 25 μm (inclusive).

The binder to be used is preferably an organic polymer binder and exemplary organic polymer binders include homopolymers or copolymers that at least contain either an acrylate ester or a methacrylate ester as a monomer component. Specific examples include (meth)acrylic resins, vinyl acetate resins, ethylene-vinyl acetate copolymer resins, vinyl chloride resins, vinyl chloride-vinylidene chloride copolymer resins, butyral resins, silicone resins, polyester resins, vinylidene fluoride resins, nitrocellulose resins, styrene resins, styrene/acrylonitrile copolymer resins, urethane resins, polyethylene, polypropylene, chlorinated polyethylene, rosin derivatives, and mixtures thereof. Particularly preferred organic polymer binders are (meth)acrylic ester resins for the reason that they provide a smaller difference in refractive index from the polymer particles.

In FIG. 1, the adhesive layer 13 is provided in order to enhance the adhesion of the light diffusing layer 14 to the transparent support 12. The back coating layer 15 is provided in order to ensure that when the manufactured diffusion film 10 is rolled on itself, the upper side of a turn of the diffusion film 10 will not stick to the lower side of the overlying turn of the diffusion film 10. The adhesive layer 13 and the back coating layer 15 are each made of a cross-linked form of an ion-conductive resin having a cationic quaternary ammonium base in side chains. A preferred ion-conductive resin having a cationic quaternary ammonium base in side chains is a water-soluble copolymer of a vinyl compound mixture comprising a vinyl compound having cationic quaternary ammonium bases and a polymerizable double bond at terminals and a vinyl compound having hydroxyl groups.

Preferred as the above-mentioned vinyl compound having cationic quaternary ammonium bases and a polymerizable double bond at terminals are (meth)acrylate compounds having cationic quaternary ammonium bases and preferred specific examples include quaternized dimethylaminoethyl acrylate, quaternized dimethylaminoethyl methacrylate, quaternized diethylaminoethyl acrylate, quaternized diethylaminoethyl methacrylate, quaternized methylethylaminoethyl acrylate, quaternized methylethylaminoethyl methacrylate, mixtures of two or more of these quaternized products, and the like.

Preferred as the above-mentioned vinyl compound having hydroxyl groups are (meth)acrylate compounds having hydroxyl groups and preferred specific examples include 2-hydroxyethyl acrylate, 2-hydroxyethyl methacrylate, polyglycerol diacrylate, polyglycerol dimethacrylate, etc.

The above-mentioned water-soluble copolymer is obtained as an aqueous solution by subjecting the mixture of above-mentioned vinyl compounds to emulsion polymerization reaction in an aqueous medium.

The mixture of vinyl compounds for producing the above-mentioned water-soluble copolymer may further contain a vinyl compound that is copolymerizable with the vinyl compound having cationic quaternary ammonium bases and a polymerizable double bond at terminals and with the vinyl compound having hydroxyl groups. Preferred specific examples of such vinyl compound include alkyl esters of acrylic acid such as methyl acrylate, ethyl acrylate, etc., alkyl esters of methacrylic acid such as methyl methacrylate, ethyl methacrylate, etc., styrene, vinyl toluene, vinyl acetate, mixtures of two or more of these vinyl compounds, and the like. Particularly preferred are alkyl esters of acrylic acid and alkyl esters of methacrylic acid.

The above-mentioned cross-linked form of an ion-conductive resin having a cationic quaternary ammonium base in side chains can preferably be obtained by subjecting a mixture of the ion-conductive resin having a cationic quaternary ammonium base in side chains and a thermally cross-linkable compound to a cross-linking reaction. This cross-linking reaction is effected by applying an aqueous solution of the mixture of the above-mentioned ion-conductive resin and thermally cross-linkable compound onto the transparent support and thereafter heating the applied coating, whereupon the hydroxyl groups possessed by the above-mentioned ion-conductive resin initiate the cross-linking reaction.

The above-mentioned thermally cross-linkable compound is preferably an epoxy compound having 2-4 glycidyl groups and specific examples include ethylene glycol diglycidyl ether, polyethylene glycol diglycidyl ether, propylene glycol diglycidyl ether, polypropylene glycol diglycidyl ether, trimethylolpropane polyglycidyl ether, diglycerol polyglycidyl ether, etc. The content of the thermally cross-linkable compound in its mixture with the ion-conductive resin having a cationic quaternary ammonium base in side chains is preferably between 3 mass % (inclusive) and 30 mass % (inclusive).

The above-mentioned composition comprising the ion-conductive resin having a cationic quaternary ammonium base in side chains and the thermally cross-linkable compound preferably has organic or inorganic alkaline compounds, such as amines, polyamines, amide amines, polyamide amines, imidazoles, alkali metal salts of acids, etc., added in order to accelerate the cross-linking reaction.

Details about the preferred examples of the cross-linked form of the above-mentioned ion-conductive resin having a cationic quaternary ammonium base in side chains which is for forming the adhesive layer 13 and the back coating layer 15 are described in JP 4-220469 A.

The adhesive layer 13 and the back coating layer 15 can be formed by the following procedure: a mixture containing the above-described ion-conductive resin and thermally cross-linkable compound is optionally diluted with water, alcohol, etc. to prepare a coating solution; the coating solution is then applied to the transparent support and heated to a temperature between 60 degrees (inclusive) and 130 degrees (inclusive) so that the solvent is evaporated off while at the same time the ion-conductive resin and the thermally cross-linkable compound are subjected to the cross-linking reaction.

From the viewpoints of light transmission and anti-blocking, the film thicknesses of the adhesive layer 13 and the back coating layer 15 are preferably between 0.05 μm (inclusive) and 5 μm (inclusive), more preferably between 0.5 μm (inclusive) and 4.5 μm (inclusive).

Even more preferably, organic polymer particles for use in the back coating layer 15 may be added, whereupon the light transmission is improved noticeably and, what is more, an improvement in the angle of view can be achieved. The amount in which the fine organic polymer particles are added is preferably 250 mass % or less, more preferably between 0.01 mass % (inclusive) and 200 mass % (inclusive), of the resin.

Hereinabove, the diffusion film is constructed by forming the adhesive layer 13, the light diffusing layer 14 and the back coating layer 15 on the transparent support 12 but this is not the sole embodiment and various additional layers may optionally be provided. For instance, a subbing layer may be provided with a view to enhancing the adhesion between the transparent support 12 and the light diffusing layer 14.

Described next is the process for producing the diffusion film 10 having the structure shown in FIG. 1.

First, prior to actual production of the diffusion film 10, the embodiment under consideration requires designing the light diffusing layer 14 such that the particles of a plurality of polymers having different particle size distributions are contained at the desired packing ratio. To be more specific, in order to ensure that the polymer particles in the light diffusing layer 14 are loaded at the desired packing ratio, the blending ratio of the particles of the plurality of polymers having different mean particle sizes or the distribution of the particles of the plurality of polymers is preliminarily determined. And the particles of the plurality of polymers are blended on the basis of the determined blending ratio or, alternatively, polymer particles having the determined distribution are employed, to thereby construct the light diffusing layer 14.

The packing ratio of the polymer particles in the light diffusing layer 14 can be determined as appropriate either for the optical characteristics desired of the diffusion film 10 or for the material of the polymer particles used. For instance, in the case where PMMA or PSt (polystyrene) is used as the polymer particles that compose the light diffusing layer 14, an increased packing ratio leads to an improvement in the Total light transmittance; in the case where melamine or silicone resin is used as the polymer particles as the light diffusing layer 14, an increased packing ratio leads to a reduction in the total ray transmittance; hence, the packing ratio is set as appropriate for the material of the polymer particles used.

In addition, if one wants to increase the total light transmittance, it is useful to minimize the refractive index difference between the polymer particles and binder to be used; on the other hand, if one wants to increase the haze value, it is useful to increase the differential refractive index.

Hereinabove, the factor that determines the packing ratio is the sizes of all particles to be loaded but it is extremely difficult to specify the sizes of all polymer particles that compose the light diffusing layer 14 and compute the packing ratio on the basis of those particle sizes. Hence, in the embodiment under consideration, the blending ratio at which polymer particles having different mean particle sizes are to be blended, the mean or variance of the particle size distributions of the polymer particles, the constants in the case where the particle size distributions of the polymer particles are approximated by a binomial distribution, or the like is used as a parameter (which is hereinafter referred to as a particle size parameter) and this particle size determining parameter is optimized to determine the particle size distributions of the polymer particles that permit them to be loaded in the light diffusing layer 14 at the desired packing ratio. On the following pages, the method of optimizing the above-mentioned particle size parameter is described.

Figure 2:
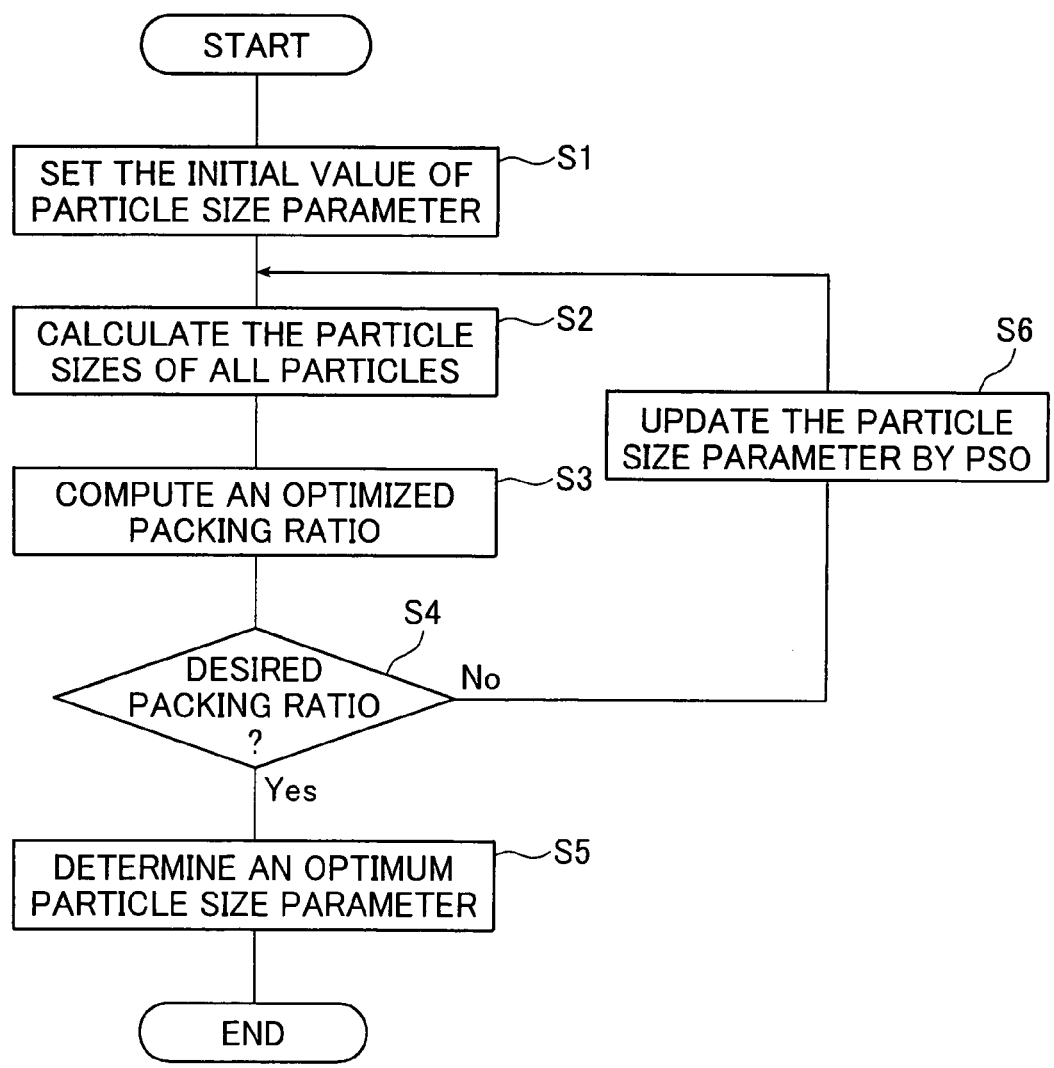
FIG. 2 is a flowchart of a method for optimizing a particle size parameter.

FIG. 2 is a flowchart of the method of optimizing the particle size parameter. The process of optimizing the particle size parameter starts with setting the initial value of the particle size determining parameter (step S1). The initial value of the particle size determining parameter can be determined by, for example, random numbers that are generated within a range suitable for the type of the particle size parameter; particularly in the case where the particle size parameter is the mixing ratio of the polymer particles, its initial value is preferably set in such a way that the sum of the particle size parameters is unity.

In the next step, the particle sizes of all particles are computed by calculation from the settings of the particle size parameter (step S2). Then, the packing ratio is calculated using the computed particle sizes of all particles (step S3). The method of calculating the packing ratio will be described later in detail. In the next step, an evaluation is made to see if the packing ratio obtained in step S3 is equal to the desired packing ratio (step S4). If the obtained packing ratio is equal to the desired packing ratio, the particle size parameter used to calculate the packing ratio in the above-mentioned step S3 is determined as an optimum particle size parameter (step S5). On the other hand, if the desired packing ratio is not attained, an optimizing technique such as particle swarm optimization (PSO) is applied to update the particle size parameter until it approaches the desired packing ratio (step S6) and the process thereafter returns to the above-mentioned step S2. Then, steps S2, S3 and S4 are repeatedly executed until the desired packing ratio is attained. The particle size parameter used when the desired packing ratio has been attained is determined as an optimum particle size parameter (step S5).

This is the way the particle size parameter is optimized.

Here, as already mentioned, the blending ratio at which polymer particles having different mean particle sizes are to be blended, the mean or variance of the particle size distributions of the polymer particles, the constants in the case where the particle size distributions of the polymer particles are approximated by a binomial distribution, or the like may be used as the particle size parameter. For example, in the case where the blending ratio at which polymer particles having different mean particle sizes are to be blended is used as the particle size parameter, the initial value of the blending ratio is set in step S1, and in step S2, the particle sizes of all particles are calculated on the basis of that blending ratio, and an optimized packing ratio is computed in step S3, and in step S4, an evaluation is made to see if it is equal to the desired packing ratio. If that is not the desired packing ratio, the blending ratio is updated in step S6 and the above-mentioned steps S2 to S4 are repeatedly executed. And the blending ratio for the case where a packing ratio equal to the desired packing ratio was obtained in step S4 is determined as an optimum blending ratio (step S5). Then, the polymer particles having the respective particle sizes are mixed on the basis of that optimum blending ratio, to thereby compose the light diffusing layer 14.

In another case where the mean or variance of the particle size distributions of the polymer particles is used as the particle size parameter, the initial value of the mean or variance of the particle size distributions is set in step S1, and in step S2, the particle sizes of all particles are calculated on the basis of that mean or variance, and an optimized packing ratio is computed in step S3, and in step S4, an evaluation is made to see if it is equal to the desired packing ratio. If that is not the desired packing ratio, the mean or variance of the particle size distributions is updated in step S6 and the above-mentioned steps S2 to S4 are repeatedly executed. And the particle size distribution that is specified by the mean average or variance of the particle size distributions in the case where a packing ratio equal to the desired packing ratio was obtained in step S4 is determined as an optimum particle size distribution (step 5S). Then, the polymer particles based on that optimum particle size distribution are used to compose the light diffusing layer 14.

In yet another case where the constants in the case where the particle size distributions of polymer particles are approximated by a binomial distribution are used as the particle size parameters, the initial values of the respective constants in the binomial distribution are set in step S1, and in step S2, the particle sizes of all particles are calculated on the basis of those constants, and an optimized packing ratio is computed in step S3, and in step S4, an evaluation is made to see if it is equal to the desired packing ratio. If that is not the desired packing ratio, the respective constants in the binomial distribution are updated in step S6 and the above-mentioned steps S2 to S4 are repeatedly executed. And the particle size distribution that is specified by the respective constants in the binomial distribution for the case where a packing ratio equal to the desired packing ratio was obtained in step S4 is determined as an optimum particle size distribution (step S5). Then, the polymer particles based on that optimum particle size distribution are used to compose the light diffusing layer 14.

If desired, the blending ratio at which polymer particles having different mean particle sizes are to be blended, the mean or variance of the particle size distributions of the polymer particles, and the constants in the case where the particle size distributions of the polymer particles are approximated by a binomial distribution may all be used as particle size parameters.

Thus, before actual production of the diffusion film 10, the blending ratio of the polymer particles that compose the light diffusing layer 14 or the mean value or variance value of their particle size distributions or the like is roughly designed on the basis of the above-described method. Then on the basis of that blending ratio or particle size distribution, the light diffusing layer 14 is composed to prepare the diffusion film 10.

The thus prepared diffusion film is evaluated to see if it has the desired optical characteristics; in the present invention, as described above, the blending ratio or particle size distribution of the polymer particles that compose the light diffusing layer is determined in such a way that the desired packing ratio is obtained and, hence, a diffusion film having the desired optical characteristics can be prepared within a shorter time and in a simpler way than has been possible by the conventional design and, as a result, the number of steps in trial production can be sufficiently reduced to lower the production cost.

In the embodiment described above, PSO was used as an optimizing technique to update the particle size parameter but this is not the sole example and other optimizing techniques can be employed, as exemplified by a genetic algorithm (GA), an immunological algorithm, and a simultaneous perturbation method.

(Packing Ratio Calculating Algorithm)

Figure 3:
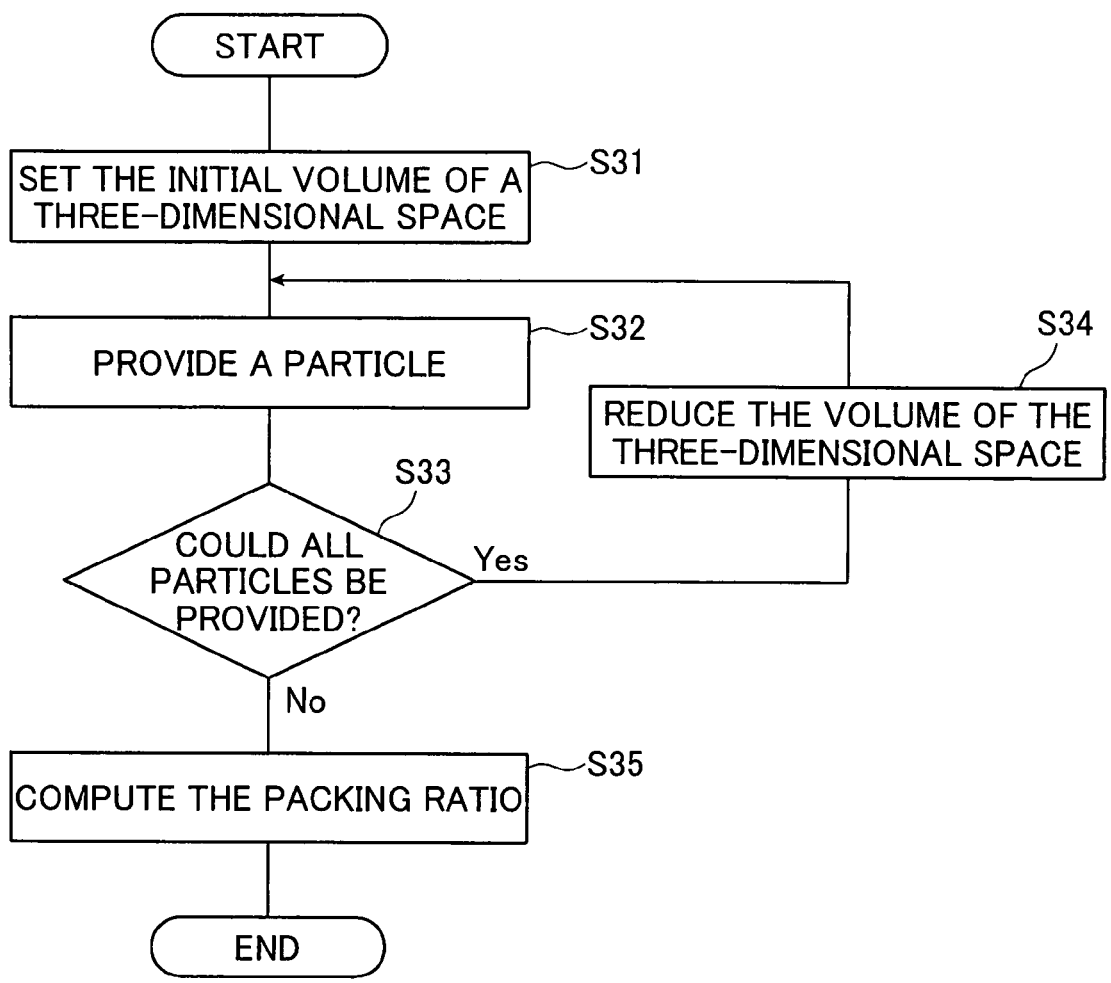
FIG. 3 is a flowchart of a packing ratio calculating algorithm.

Descried hereinafter is a packing ratio calculating algorithm that is used to calculate the packing ratio in the above-mentioned step S3. As described below, the packing ratio calculating algorithm in the embodiment under consideration is an algorithm that performs a sort of linear search to look for a minimum space into which a group of particles can be packed with the particle number and size being given. FIG. 3 shows a flowchart of the packing ratio calculating algorithm.

The first step of the packing ratio calculating algorithm is to set the initial volume of a three-dimensional space V1 in which particles are to be arranged (step S31). In this case, the initial volume of the three-dimensional space V1 is preferably set to have a comparatively large value. For example, this initial volume can be set to measure ten times the sum of the volumes of all polymer particles. Although the initial volume is set here to measure ten times the sum of the volumes of all polymer particles, this is not the sole embodiment and the initial volume can be set to any value so long as it is a sufficient volume for permitting all polymer particles to be arranged.

In the next step, particles are arranged in the thus set three-dimensional space V1 on the basis of a particle packing algorithm (step S32). The particle packing algorithm is an algorithm for packing particles into a specified three-dimensional space and it is an algorithm that performs a sort of random search to look for an appropriate method of arranging a group of particles with the particle number, particle size, and space volume being given. On the following pages, the particle packing algorithm is described in detail.

(Particle Packing Algorithm)

Figure 4:
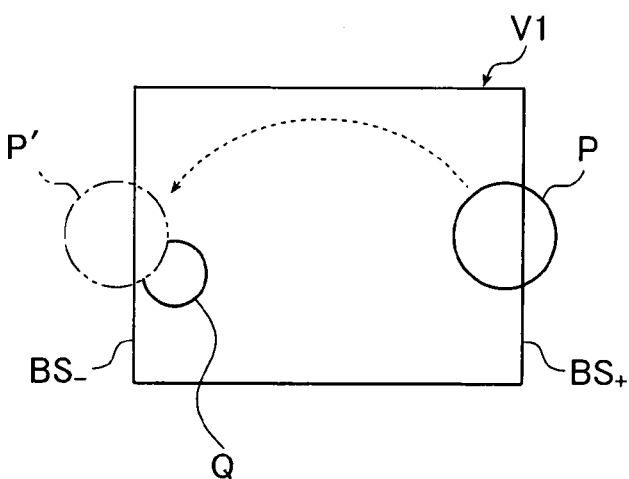
FIG. 4 is a diagram for illustrating the periodic boundary condition in a particle packing algorithm.
Figure 5A:
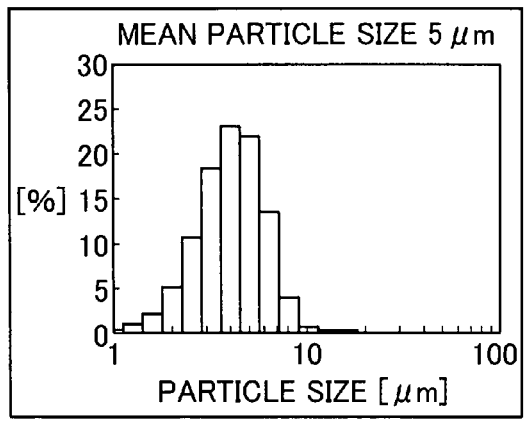
FIGS. 5A to 5E show the particle size distributions of particles to be used in a light diffusing layer.
Figure 5B:
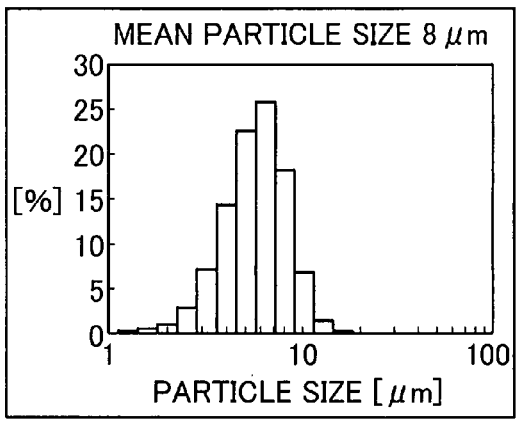
Figure 5C:
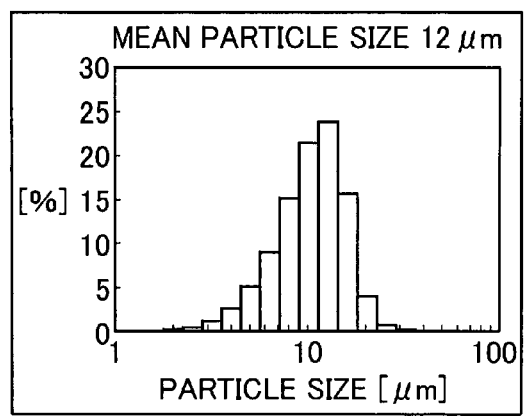
Figure 5D:
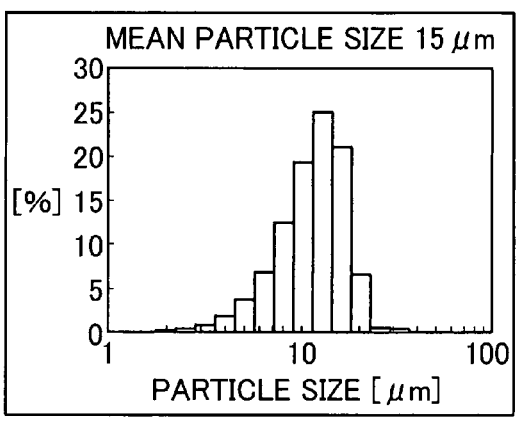
Figure 5E:
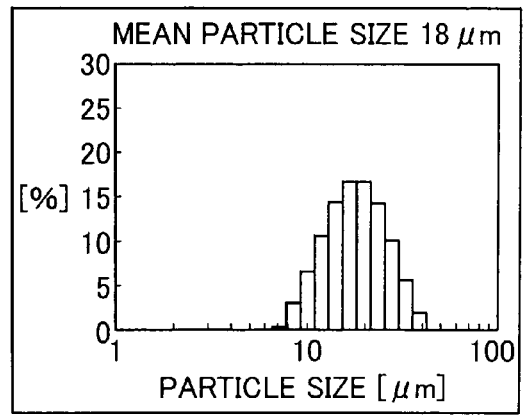
Figure 6A:
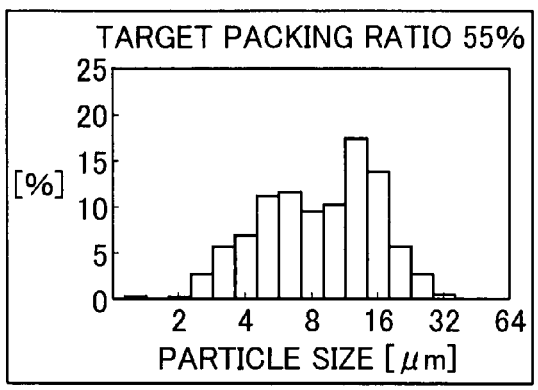
FIGS. 6A to 6F show the particle size distributions of particle groups that have been mixed to provide target packing ratios of 55%, 60%, 65%, 70%, 75%, and 80%, respectively.
Figure 6B:
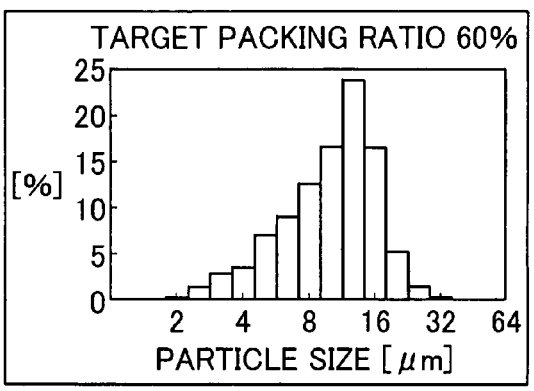
Figure 6C:
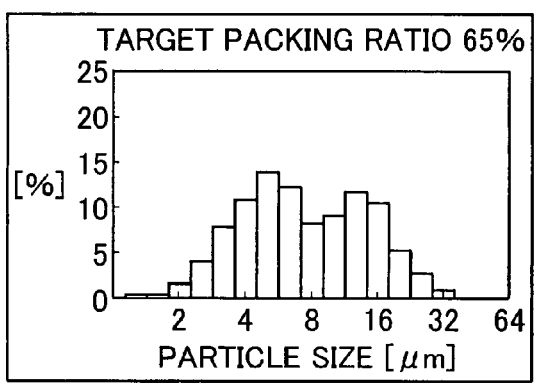
Figure 6D:
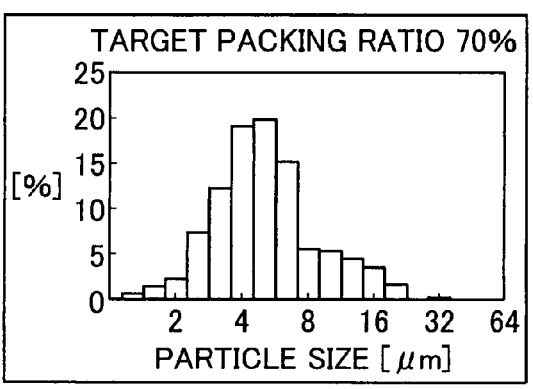
Figure 6E:
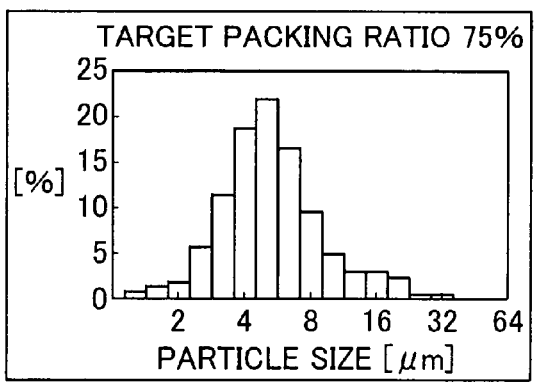
Figure 6F:
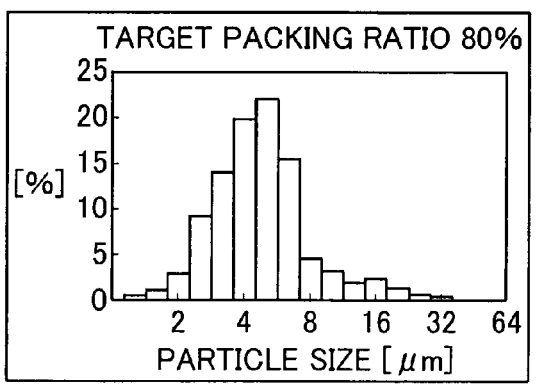

The first step of the particle packing algorithm is to determine by random numbers the center coordinates of a particle that is to be loaded in the three-dimensional space V1. In the next step, the particle of interest is provided in the three-dimensional space V1 and evaluated for any overlap with another particle that was already provided in that space. Suppose here that the particle P is provided in close proximity to the boundary surface $BS_+$ of the three-dimensional space V1 as shown in FIG. 4; if the size of that particle is large, this particle P may sometimes sit across the boundary surface $BS_+$ of the three-dimensional space V so that a portion of it is located in a region outside of the three-dimensional space V1. In a case like this, a counterpart P' of that portion of the particle which is located outside the three-dimensional space V is constructed in a position inward of the boundary surface $BS_-$ which is opposite to but away from the boundary surface $BS_+$. Then, the interior of the three-dimensional space V1 is evaluated for any overlap that may exist not only between the particle P and another particle but also between its counterpart P' and another particle Q (periodic boundary condition).

If the particle that has been provided in the three-dimensional space V1 on the basis of the above-described technique is found to have no overlap with any particles, the particle is fixed in that position and the next particle is provided in the three-dimensional space V1. If the particle that has been provided is found to have any overlap with another particle, that particle is replaced at a different position in the three-dimensional space V1. If this process of replacement continues for the same particle, the last of the particles that have already been provided in the three-dimensional space V is replaced at a different position than where it was provided and, thereafter, the next particle is provided in the three-dimensional space V1 by the same technique as described above. If the overall situation is a "dead end", an error is outputted and the process ends. For example, an error is outputted if the step by which a particle that has ever been provided at least once within the three-dimensional space V1 is replaced at another position has continued as many as a million times.

This is how the particle packing algorithm works for packing particles into the three-dimensional space.

We now get back to FIG. 3 to further explain the packing ratio calculating algorithm.

After providing particles successively in the three-dimensional space V1 on the basis of the particle packing algorithm in step S32, an evaluation is made to see if it has been possible to arrange all particles in that three-dimensional space V1 (step S33). And if it has been possible to arrange all particles in that three-dimensional space V1, this three-dimensional space V1 is reduced, whereby the three-dimensional space in which to arrange particles is reset to a three-dimensional space V2 of a smaller volume (step S34). Methods that can be used here to reduce the three-dimensional space V1 to a smaller three-dimensional space include, for example, simple reduction by a specified volume, as well as a method in which the number of steps required to arrange all particles is relied upon to calculate an approximate value of the spatial margin for the case where all particles are arranged in that three-dimensional space and the latter is reduced by a volume proportional to that value.

In the thus reduced three-dimensional space V2, all particles are arranged on the basis of the particle packing algorithm. And as long as all particles can be packed into the thus set three-dimensional space, the process of reducing the three-dimensional space and that of packing particles into this three-dimensional space by the particle packing algorithm are repeatedly executed.

If, on the other hand, the evaluation in step S33 shows that no more particles can be arranged in the three-dimensional space, the volume of the three-dimensional space that just precedes the setting of that three-dimensional space and the total number of particles in it are relied upon to compute the packing ratio of the particles and the process ends (step S35).

Thus, the packing ratio calculating algorithm has been described with reference to FIG. 3.

The thus obtained packing ratio is compared with the desired packing ratio (target packing ratio) in step S4 in the flowchart shown in the above-described FIG. 2. If it is found to be equal to the desired packing ratio, an optimum particle size parameter is determined as shown in step S5. If, on the other hand, it is found to be different from the desired packing ratio, updating of the particle size parameter is executed by PSO in step S6.

In the above-described method of optimizing the particle size parameter, step S4 in the flowchart shown in FIG. 2 makes an evaluation to see if the obtained packing ratio is equal to the target packing ratio or not; however, this is not the sole embodiment and the target packing ratio may be set to be variable over a certain range such that an evaluation is made to see if the obtained packing ratio is included within that range and if it is, an optimum particle size parameter is determined in step S5; if it is not, step S6 may be executed to update the particle size parameter by PSO. The range over which the target packing ratio is variable may, for example, be about ±1%.

Described hereinabove is the method of designing the light diffusing layer in the diffusion film.

The light diffusing layer that has been designed to have the desired optical characteristics by the above-described technique is formed on top of the adhesive layer 13 on the transparent support 12. More specifically, the first step comprises preparing a coating solution by mixing or dispersing polymer particles, that have been blended at a specified blending ratio, and a binder in an organic solvent. Then, this coating solution is applied over the adhesive layer 13 formed on the transparent support 12 by using a known coating means such as a spin coater, a roller coater, a bar coater, a curtain coater, or the like. The light diffusing layer can thusly be formed on top of the adhesive layer 13 on the transparent support 12. The coating means for applying the light diffusing layer 14 is not limited in any particular way but a bar coater is preferred for the reason that it allows for continuous production.

The organic solvent to be used in the coating solution for the light diffusing layer 14 may, for example, be composed of two or more organic solvents and it has an optimum mixed specific gravity. As a result, the tendency of particles to precipitate during the coating operation can be controlled while, at the same time, the ability to dissolve the binder resin is satisfied, leading to a marked enhancement of light transmission and an improvement in the angle of view. The mixed specific gravity of the organic solvent in the coating solution that is composed of two or more organic solvents can be defined as the sum total of the proportions (mass proportions) of the respective organic solvents in the organic solvent in the coating solution that are multiplied by their specific gravities. From the viewpoint of controlling the precipitation of particles, the mixed specific gravity of the coating solution preferably assumes a value greater than 0.85 but smaller than 1, more preferably from 0.85 (inclusive) up to 0.95 (inclusive). Solvents that can be used are various known solvents that are used in the coating solution for the light diffusing layer.

The preparation of the diffusion film 10 having the structure shown in FIG. 1 starts with providing the transparent support 12. Then, a coating solution for the adhesive layer 13 is applied to one side of the transparent support 12 by, for example, a wire bar #10 and dried at a specified temperature. In this way, a specified thickness of the adhesive layer 13 is formed on one side of the transparent support 12. In the next step, a coating solution for the back coating layer 15 is applied to the side of the transparent support 12 which is opposite the side where the adhesive layer 13 was formed; similarly, a wire bar #10 is used to apply the coating solution which is then dried at a specified temperature. In this way, a specified thickness of the back coating layer 15 is formed on the other side of the transparent support 12. In the next step, a coating solution for the light diffusing layer 14 is applied to the side of the transparent support 12 where the adhesive layer 13 was formed, using, for example, a wire bar #22 and then dried at a specified temperature. As a result, the light diffusing layer 14 is formed on top of the adhesive layer 13. In this way, the diffusion film 10 having the structure shown in FIG. 1 is produced.

In the next step, the compositional ratios at which five types of particles having different particle size distributions were blended to realize the desired packing ratios (target packing ratios) were calculated in accordance with the above-described method of designing the light diffusing layer. FIGS. 5A to 5E depict the particle size distributions of the five types of particles. The target packing ratios were set at 55%, 60%, 65%, 70%, 75% and 80%, and the compositional ratios for the respective values were calculated. The following Table 1 shows the target packing ratios and the corresponding compositional ratios.

TABLE 1

| Target packing ratio (%) | Compositional Ratio (%) | | | | |
|---|---|---|---|---|---|
| | 5 µm | 8 µm | 12 µm | 15 µm | 18 µm |
| 55 | 25.38 | 7.92 | 7.22 | 52.17 | 7.30 |
| 60 | 8.73 | 4.19 | 31.26 | 50.8 | 5.39 |
| 65 | 41.38 | 10.76 | 11.49 | 22.38 | 13.98 |
| 70 | 77.51 | 7.30 | 9.37 | 4.29 | 1.53 |
| 75 | 60.62 | 23.50 | 9.71 | 1.00 | 5.17 |
| 80 | 84.8 | 7.0 | 3.7 | 0.12 | 4.4 |

The five types of particles used were MB20X-5 with a mean particle size of 5 µm (product of SEKISUI PLASTICS CO., LTD.), MBX-8 with a mean particle size of 8 µm (product of SEKISUI PLASTICS CO., LTD.), MBX-12 with a mean particle size of 12 µm (product of SEKISUI PLASTICS CO., LTD.), MBX-15 with a mean particle size of 15 µm (product of SEKISUI PLASTICS CO., LTD.), and MBX-20 with a mean particle size of 18 µm (product of NIHON JUNYAKU Co., Ltd.) They all were particles of poly(methyl methacrylate). The particle size distributions of particle groups prepared by blending on the basis of the compositional ratios that would realize the respective target packing ratios listed in the above Table 1 are shown in FIGS. 6A to 6F.

Figure 7:
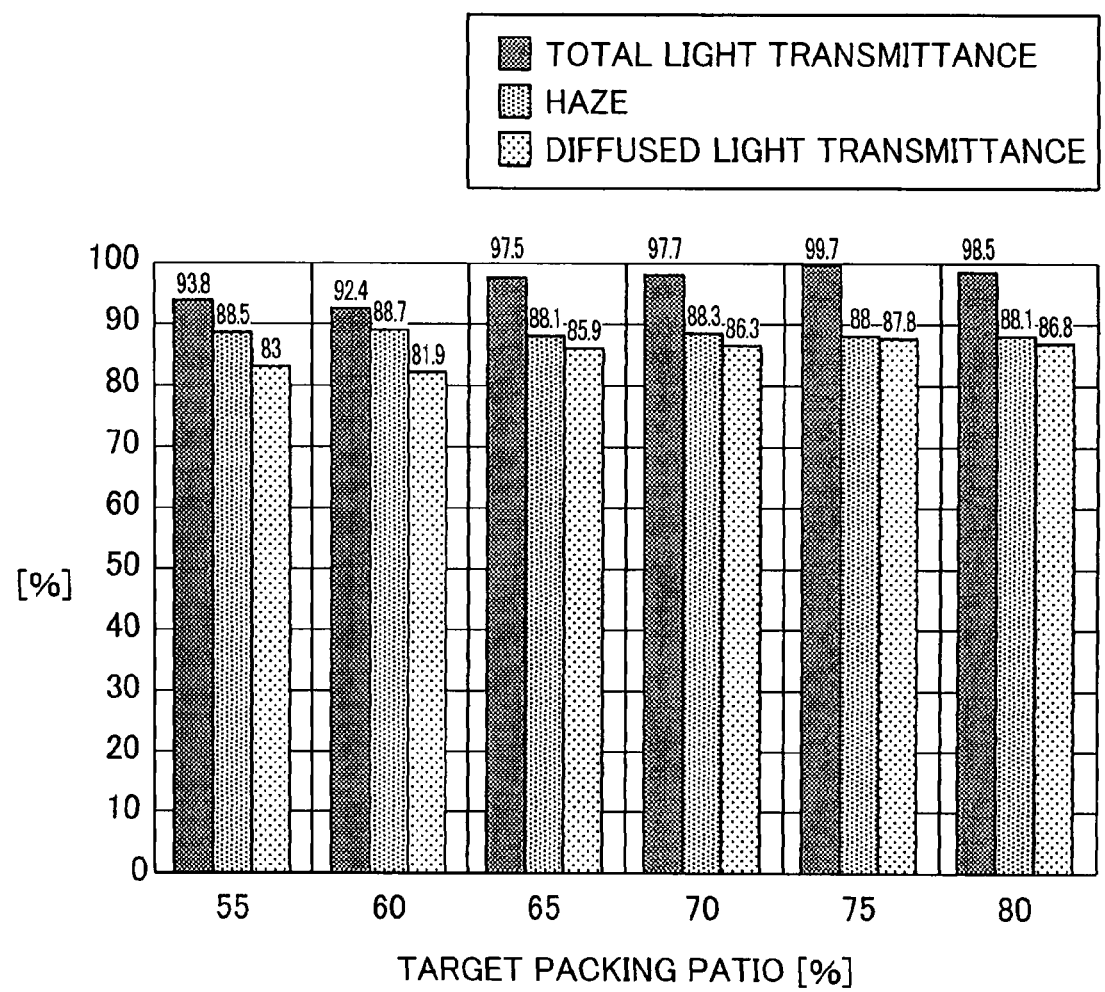
FIG. 7 is graph showing the Total light transmittances, hazes and diffused light transmittances of various diffusion films that were produced with the various target packing ratios in the embodiment under consideration.

In addition, light diffusing layers were prepared on the basis of the compositional ratios listed in Table 1 and diffusion films having the structure shown in FIG. 1 were prepared. Then, each of the diffusion films obtained was measured for the total light transmittance, haze, and diffused light transmittance. The measured values are shown in FIG. 7. The total light transmittance, haze, and diffused light transmittance were measured using a C light source in Model HZ-1 of Suga Test Instruments Co., Ltd.

For the sake of reference, the diffusion films obtained were assembled into backlight units, which were then measured for the front brightness and the half brightness angle. The results of the measurements are shown in the following Table 2.

TABLE 2

| Target packing ratio (%) | Half brightness angle (deg.) | Brightness (cd/m$^2$) |
|---|---|---|
| 55 | 36.61 | 10740 |
| 60 | 36.49 | 10725 |
| 65 | 36.82 | 10785 |
| 70 | 36.81 | 10680 |
| 75 | 36.89 | 10735 |
| 80 | 36.82 | 10670 |

From the results of measurements shown in FIG. 7, it can be seen that by changing the packing ratio of particles, the total light transmittance can be varied while causing little change in the haze value. In particular, it is seen that diffusion films of high transmittance can be prepared by adjusting the packing ratio to lie within the range from 70% (inclusive) up to 90% (inclusive).

In the present invention, an optimum particle size parameter that is determined in accordance with the above-described method and the results for the optical characteristics of diffusion films having light diffusing layers that are formed on the basis of that particle size parameter are desirably used to accumulate data for the relation between the particle size parameter and the optical characteristics of the diffusion film. Alternatively, the relation between the packing ratio of polymer particles that compose the light diffusing layer and the optical characteristics of diffusion films having light diffusing layers that are formed on the basis of an optimum particle size parameter that provides that packing ratio is desirably accumulated as data. This offers an advantage in the case of preparing a diffusion film by forming a light diffusing layer using polymer particles that differ in the material of which they are made or in particle size; to be more specific, if an optimum particle size parameter or the packing ratio used to determine that optimum particle size parameter is determined on the basis of the accumulated data, a diffusion film having the intended optical characteristics can be produced in a comparatively simple way. Therefore, the number of steps in trial production can be further decreased and, hence, the materials cost and the time to production can be further reduced.

It should also be noted that ideal values of the total light transmittance, haze and diffused light transmittance of the diffusion film vary with a specific application of use and the like. Therefore, if diffusion films are prepared on a trial and error basis as in the prior art, the time and materials cost must be increased in order to obtain ideal optical characteristics. However, according to the present invention, the blending ratio or the mean or variance of particle size distributions is determined from the packing ratio of polymer particles that compose the light diffusing layer and a diffusion film is produced by mixing polymer materials on the basis of the determined blending ratio or employing polymer particles that are based on the determined mean or variance of particle size distributions and, hence, an ideal diffusion film that suits a particular application of use can be produced in a simple way and at low cost.

While the method of designing a diffusion film, the process for producing a diffusion film, and the diffusion film obtained thereby according to the present invention have been described above in detail, the present invention is by no means limited to the embodiment described above and it should of course be understood that various improvements and alterations can be made without departing from the gist of the present invention.

INDUSTRIAL APPLICABILITY

The method of designing a diffusion film according to the present invention enables simple designing of a diffusion film having desired characteristics that suit a particular object of use or application in use. Therefore, it can be employed as a method of designing a diffusion film for typical use in planar lighting devices utilized in liquid-crystal displays, overhead projectors, illuminated billboards, etc.

In addition, the process for producing a diffusion film according to the present invention enables a diffusion film having desired performance to be produced in a simple way and at low cost. Therefore, it can be employed as a process for producing a diffusion film for typical use in planar lighting devices utilized in liquid-crystal displays, overhead projectors, illuminated billboards, etc.

Further in addition, the diffusion film according to the present invention can be produced in a fewer steps than in the prior art and rendered less expensive than in the prior art. Therefore, it can be employed as a diffusion film for typical use in planar lighting devices utilized in liquid-crystal displays, overhead projectors, illuminated billboards, etc.

The invention claimed is:

1. A method of designing a diffusion film that has a light diffusing layer on a transparent support and diffuses incident light so that said incident light emerges as diffused light, comprising the steps of:
   specifying plural types of particle groups that are to be contained in said light diffusing layer, said plural types of particle groups having different particle size distributions each other;
   setting a space packing ratio of said plural types of particle groups in said light diffusing layer; and
   computing a blending ratio of the respective plural types of particle groups such that said space packing ratio is obtained.

2. The designing method according to claim 1, wherein said blending ratio is computed using particle swarm optimization.

3. The designing method according to claim 1, wherein said space packing ratio is set within a range from 70% to 90%.

4. The designing method according to claim 1, wherein said blending ratio is computed by a calculation method comprising:
   a blending ratio setting step of setting an initial value of said blending ratio;
   a space setting step of setting a virtual space in which to arrange individual particles of said plural types of particle groups;
   a particle arranging step of arranging said individual particles of said plural types of particle groups irregularly in said space;
   a packing ratio computing step in which if all particles of said plural types of particle groups are arranged in said space, said space is reduced and said particle arranging step is executed in the thus reduced space and if not all particles of said plural types of particle groups are arranged in said space, a packing ratio of said plural types of particle groups is computed from a volume of the space in which the particles have been last packed; and an evaluation step in which the packing ratio computed by said packing ratio computing step is compared with said space packing ratio to see if the two are equal, and if not, the initial value of said blending ratio is updated and said space setting step is executed with the updated blending ratio.

5. The designing method according to claim 1, further comprising the step of:
computing and setting any one of parameters selected from the group consisting of means and variances of the particle size distributions of said plural types of particle groups, as well as constants in a case where each of the particle size distributions of said plural types of particle groups is approximated by a binomial distribution.

6. The designing method according to claim 1, wherein said plural types of particle groups are a polymer having optical transparency.

7. A method of designing a diffusion film that has a light diffusing layer on a transparent support and diffuses incident light so that said incident light emerges as diffused light, comprising the steps of:
setting a space packing ratio of particle groups that are to be contained in said light diffusing layer;
computing any one of parameters selected from the group consisting of means and variances of particle size distributions of said particle groups, as well as constants in a binomial distribution by which said particle size distributions of said particle groups are approximated such that said space packing ratio is obtained; and
designing said light diffusing layer using said particle groups having said particle size distributions that are specified by the parameter.

8. The designing method according to claim 7, wherein said parameter is computed using particle swarm optimization.

9. The designing method according to claim 7, wherein said space packing ratio is set within a range from 70% to 90%.

10. A process for producing a diffusion film that has a light diffusing layer on a transparent support and diffuses incident light so that said incident light emerges as diffused light, comprising the steps of:
providing both said transparent support and plural types of particle groups that are to be contained in said light diffusing layer, said plural types of particle groups having different particle size distributions each other;
computing a blending ratio of said plural types of particle groups such that a space packing ratio of said respective particles in said light diffusing layer becomes a specified space packing ratio; and
dispersing and adhering said plural types of particle groups having been blended in the computed blending ratio on said transparent support to form said light diffusing layer on said transparent support.

11. The process for producing a diffusion film according to claim 10, wherein said blending ratio is computed using particle swarm optimization.

12. The producing process according to claim 10, wherein said specified space packing ratio is within a range from 70% to 90%.

13. The producing process according to claim 10, wherein said blending ratio is computed by a calculation method comprising:
a blending ratio setting step of setting an initial value of said blending ratio;
a space setting step of setting a virtual space in which to arrange individual particles of said plural types of particle groups;
a particle arranging step of arranging said individual particles of said plural types of particle groups irregularly in said space;
a packing ratio computing step in which if all particles of said plurality of particle groups are arranged in said space, said space is reduced and said particle arranging step is executed in the thus reduced space and if not all particles of said plural types of particle groups are arranged in said space, a packing ratio of said plural types of particle groups is computed from a volume of the space in which the particles have been last packed; and
an evaluation step in which the packing ratio computed by said packing ratio computing step is compared with said space packing ratio to see if the two are equal, and if not, the initial value of said blending ratio is updated and said space setting step is executed with the updated blending ratio.

14. The producing method according to 10, wherein said plural types of particle groups are formed of a polymer having optical transparency.

15. A process for producing a diffusion film that has a light diffusing layer on a transparent support and diffuses incident light so that said incident light emerges as diffused light, comprising the steps of:
computing preliminarily any one of parameters selected from the group consisting of means and variances of particle size distributions of particle groups, as well as constants in a binomial distribution by which said particle size distributions of said particle groups are approximated such that a space packing ratio of said particle groups to be contained in said light diffusing layer becomes a specified space packing ratio; and
allowing the particle groups having the particle size distributions that are specified by the computed parameter to disperse and adhere on said transparent support to form said light diffusing layer on said transparent support.

16. The producing process according to claim 15, wherein said parameter is computed using particle swarm optimization.

17. The producing process according to claim 15, wherein said specified space packing ratio is within a range from 70% to 90%.

* * * * *